US006990145B2

(12) United States Patent
Monro et al.

(10) Patent No.: US 6,990,145 B2
(45) Date of Patent: Jan. 24, 2006

(54) MOTION ESTIMATION AND COMPENSATION IN VIDEO COMPRESSION

(75) Inventors: Donald Martin Monro, Frome (GB); Adrian Nigel Evans, nr Westbury (GB)

(73) Assignee: Ayscough Visuals LLC, Los Altos, CA (US)

( * ) Notice: Subject to any disclaimer, the term of this patent is extended or adjusted under 35 U.S.C. 154(b) by 666 days.

(21) Appl. No.: 10/081,392

(22) Filed: Feb. 21, 2002

(65) Prior Publication Data

US 2002/0131502 A1 Sep. 19, 2002

Related U.S. Application Data

(63) Continuation of application No. PCT/GB00/03053, filed on Aug. 8, 2000.

(30) Foreign Application Priority Data

Aug. 26, 1999 (GB) .................................... 9920256

(51) Int. Cl.
*H04N 7/12* (2006.01)
*H04N 11/02* (2006.01)

(52) U.S. Cl. ............................ 375/240.12; 375/240.16

(58) Field of Classification Search ........... 375/240.16, 375/240.21, 240.12; 348/97; 382/199, 107
See application file for complete search history.

(56) References Cited

U.S. PATENT DOCUMENTS 5,027,203 A 6/1991 Samad et al.
5,497,191 A 3/1996 Yoo et al.
5,510,834 A * 4/1996 Weiss et al. .................. 348/97
5,764,803 A * 6/1998 Jacquin et al. .............. 382/236
6,278,736 B1 * 8/2001 De Haan et al. ........ 375/240.16
6,349,114 B1 * 2/2002 Mory .................... 375/240.21
6,400,846 B1 * 6/2002 Lin et al. .................... 382/199
6,507,661 B1 * 1/2003 Roy ........................... 382/107

FOREIGN PATENT DOCUMENTS

EP 0 414 113 A2 2/1991

(Continued)

OTHER PUBLICATIONS

Kamikura, K et al. "Global Motion Compensation In Video Coding" Electronics & Communications In Japan, vol. 78, No. 4, Apr. 1, 1995 pp. 91-101.

(Continued)

*Primary Examiner*—Gims Philippe
*Assistant Examiner*—Erick Rekstad
(74) *Attorney, Agent, or Firm*—Woodcock Washburn LLP

(57) ABSTRACT

A method of video motion estimation is described for determining the dominant motion in a video image. The dominant motion is defined by a parametric transform, for example a similarity transform. In the preferred embodiment, selected pairs of blocks in one frame are traced by a block matching algorithm into a subsequent frame, and their change in position determined. From that information, an individual parameter estimate is determined. The process is repeated for many pairs of blocks, to create a large number of parameter estimates. These estimates are then sorted into an ordered list, the list is preferably differentiated, and the best global value for the parameter is determined from the differentiated list. One approach is to take the minimum value of the differentiated list, selected from the longest run of values which fall below a threshold value. Alternatively, the ordered list may be examined for flat areas, without explicit differentiation. The technique is particularly suited to low complexity, low bit rate multimedia applications, where reasonable fidelity is required without the computational overhead of full motion compensation.

7 Claims, 3 Drawing Sheets

FOREIGN PATENT DOCUMENTS

| | | |
|---|---|---|
| EP | 0 797 357 A2 | 9/1997 |
| GB | 2 277 002 | 10/1994 |

OTHER PUBLICATIONS

Hirohisa Jozawa et al.: "Two Stage Motion Compensation Using Adaptive Global MC And Local Affine MC" IEEE Transactions On Circuits And Systems For Video Technology, US IEEE Inc. New York, vol. 7, No. 1, Febraary 1, 1997 pp. 75-85.

Lee X and Zhang Y.Q. "A Fast Heirarchial Motion-Compensation Scheme for Video Coding Using Block Feature Matching" vol. 6, No. 6, 1996, pp. 627-635.

* cited by examiner

MOTION ESTIMATION AND COMPENSATION IN VIDEO COMPRESSION

This is a continuation of International Application PCT/GB00/03053, with an international filing date of Aug. 8, 2000, published in English under PCT article 21(2).

The present invention relates generally to methods of motion estimation and compensation for use in video compression.

Motion estimation is the problem of identifying and describing the motion in a video sequence from one frame to the next. It is an important component of video codecs, as it greatly reduces the inherent temporoal redundancy within video sequences. However, it also accounts for a large proportion of the computational effort. To estimate the motion of pixels between pairs of images block matching algorithms (BMA) are regularly used, a typical example being the Exhaustive Search Algorithm (ESA) often employed by MPEG-II. Many researchers have proposed and developed algorithms to achieve better accuracy, efficiency and robustness. A common approach is to search in a coarse to fine pattern or to employ decimation techniques. However, the saving in computation is often at the expense of accuracy. This problem has been largely overcome by the successive elimination algorithm (SEA) (Lee X., and Zhang Y. Q. "A fast hierarchical motion-compensation scheme for video coding using block feature matching", *IEEE Trans. Circuits Systems Video Technol*., vol. 6, no. 6, pp. 627–635 1996). This produces identical results to the ESA with greatly reduced computation. However, block-based motion estimation still remains a significant computational expense and is sensitive to noise. A further disadvantage of a block-based approach is that the motion vectors constitute a significant proportion of the bandwidth, particularly at low bit rates. This is one reason why standard systems such as MPEG II or H263 use larger block sizes.

In typical multimedia video sequences, many image blocks share a common motion, as scenes are often of low complexity. If more than half the pixels in a frame can be regarded as belonging to one object, we define the motion of this object as the dominant motion. This definition places no further restrictions on the dominant object type; it can be a large foreground object, the image background, or even fragmented. A model of the dominant motion represents an efficient motion coding scheme for low complexity applications such as those found in multimedia and has become a focus for research during recent years. For internet video broadcast, a limited motion compensation scheme of this type offers a fidelity enhancement without the overhead of full motion estimation.

The use of a motion model can lead to more accurate computation of motion fields and reduces the problem of motion estimation to that of determining the model parameters. One of the attractions of this approach for video codec applications is that the model parameters use a very small bandwidth compared with that of a full block-based motion field.

Conventional approaches to estimating motion are typically complex and computationally expensive. In one standard approach, for example, least squares techniques are used to estimate parameter values which define average block motion vectors across the image. While such an approach frequently gives good results, it requires more computational effort than is always justified, particularly when applied to low complexity, low bit rate multimedia applications. The approach is also rather sensitive to outliers.

It is an object of the present invention at least to alleviate these problems of the prior art. It is a further object to provide good fidelity within a video compression scheme without the computational overheads of full motion compensation. It is a further object to provide a robust, reliable and computationally-inexpensive method of motion estimation and compensation, particularly although not exclusively for use with low complexity, low bit rate multimedia applications.

According to the present invention there is provided a method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list.

It has been found in practice that the present method provides good motion estimation, particularly for low bit rate multimedia applications, with considerably reduced computational complexity.

In the preferred form of the invention, the motion compensation is based upon estimating parameters for a similarity transform from the measured movement of individual image blocks between first and second frames. These frames will normally be (but need not be) consecutive. A large number of individual estimates of the parameter are obtained, either from the movement of individual blocks, or from the movement of pairs of blocks or even larger groups of blocks.

All of the individually-determined estimates for the parameter are placed into an ordered list. As the dominant motion is the motion of the majority of the blocks, many of the estimates will be near those of the dominant motion. In order to obtain a reliable and robust "best" global value for the required parameter, the ranked list of individual estimates is differentiated. The best global estimate may then be determined from the differentiated list. Alternatively, the best global value may be determined by directly looking for a flat area or region in the ordered list, without explicit differentiation.

In one preferred form of the invention, a threshold value is applied to the differentiated list, and the system looks for the longest available run of values which fall below the threshold. Values above the threshold are excluded from consideration as being "outliers"; these will normally be spurious values which arise because of block mismatch errors, noise, or the very rapid motion of small objects within the image. There are numerous possible ways of obtaining the "best" global value, including selecting the minimum value within the differentiated list, or selecting the mid-point of all of the values which lie beneath the threshold. It is also envisaged that more complex calculations could be carried out if, in particular applications, additional effort is needed to remove spurious results and/or to improve the robustness of the chosen measure.

The invention extends to a method of video motion compensation which makes use of the described method of video motion estimation. It further extends to a codec including a motion estimator and/or motion compensator which operates as described. The motion estimator and/or motion compensator may be embodied either in hardware or in software. In addition, the invention extends to a computer program for carrying out any of the described methods and to a data carrier which carries such a computer program.

In a practical implementation, the method of the present invention may be used in conjunction with any suitable block matching algorithm (BMA). In one embodiment, the block matching and the motion estimation may be carried out iteratively.

The invention may be carried into practice in several ways and one specific embodiment will now be described, by way of example, with reference to the accompanying drawings, in which.

MOTION ESTIMATION

As mentioned above, motion estimation relates to the identifying and describing of the motion which occurs in a video sequence from one frame to the next. Motion estimation plays an important role in the reduction of bit rates in compressed video by removing temporal redundancy. Once the motion has been estimated and described, the description can then be used to create an approximation of a real frame by cutting and pasting pieces from the previous frame. Traditional still-image coding techniques may be used to code the (low powered) difference between the approximated and the real new frames. Coding of this "residual image" is required, as motion estimation can be used only to help code data which is present in both frames; it cannot be used in the coding of new scene content.

The first step in describing the motion is to match corresponding blocks between one frame and the next, and to determine how far they have moved. Most current practical motion estimation schemes, such as those used in MPEG II and H263 are based on block matching algorithms (BMAs).

Block matching may be carried out in the present invention by any convenient standard algorithm, but the preferred approach is to use the Successive Elimination Algorithm (SEA). The size of the blocks to be used, and the area over which the search is to be carried out, is a matter for experiment in any particular case. We have found, however, that a block size of 8×8 pixels typically works well, with the search being carried out over a 24×24 pixel area. When motion blocks lie near the edge of images, the search area should not extend outside the image. Instead, smaller search areas should be used.

Having found the best matching block, it should be noted that the position will be accurate only to plus or minus half pixel, as the true motion in the real world could be a fraction of a pixel while the motion found by the block matching algorithm is of necessity rounded to the nearest integer value. However, an improved estimate at a sub-pixel level can be determined by calculating the error values for the pixel in question and for some other pixels (for example those pixels which are adjacent to it within the image). A bi-quadratic or other interpolation may then be carried out on the resulting "error surface", to ascertain whether the error surface may have a minimum error at a fractional pixel-position which is smaller than the error already determined for the central pixel.

Figure 5:
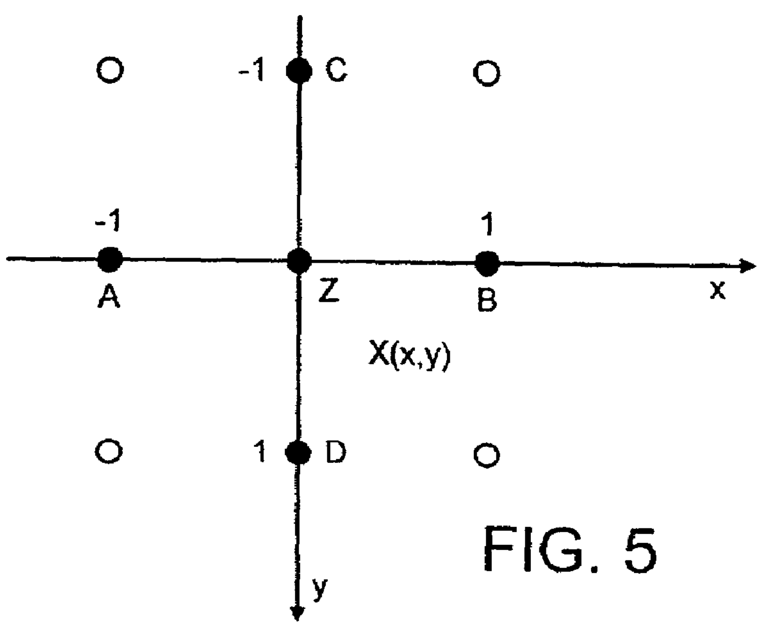
FIG. 5 illustrates the preferred bi-quadratic interpolation used to estimate motion to sub-pixel accuracy.

Turning next to FIG. 5, Z represents the pixel with the minimum error value, as determined by the block matching algorithms. The surrounding pixels are designated A, B, C and D. Using a bi-quadratic interpolation to determine the position of the actual minimum at X (x,y), we get:

$$x=\tfrac{1}{2}(A-B)/(A+B-2Z)$$

$$y=\tfrac{1}{2}(C-D)/(C+D-2Z)$$

In the above equations, A, B, C, D and Z represent the error values for the corresponding pixels shown in FIG. 5, and (x, y) is the position of the estimated true minimum X.

Other interpretation approaches could of course be used, depending upon the requirements of the application.

For many multimedia applications, the dominant motion can be described by a similarity transform that has only four parameters. As shearing is relatively rare in most video sequences, its exclusion does not normally compromise the generality of the model.

If we let (u,v) be the block co-ordinates in the previous frame and (x,y) the corresponding co-ordinates of the same block in the new frame (as determined by the block matching algorithm), then the similarity model gives:

$$u=ax+by+d_x$$

$$v=-bx+ay+d_y$$

where $$a=M\cos\theta$$

$$b=M\sin\theta$$

The four parameters that ultimately need to be determined are pan ($d_x$), tilt ($d_y$), zoom (M) and rotation (θ). If all the pixels move together, then in the absence of noise and block-matching errors, the four parameters $d_x$, $d_y$, M and θ could be uniquely determined by selecting any two blocks within a given frame and determining where those blocks move to in the subsequent frame. Put more precisely, the equations can be uniquely solved by a knowledge of the coordinates of any two selected blocks ($x_1$, $y_1$), ($x_2$, $y_2$) in the current frame and the corresponding co-ordinates ($u_1$, $v_1$), ($u_2$, $v_2$) in the preceding frame.

In order to overcome the effect of errors and to find the dominant motion where other moving objects are present, calculations of a and b (or equivalently, M and θ) for large numbers of selected pairs of blocks in the image. Each selected pair of blocks in the image, along with the mapping of those blocks into the subsequent image, gives an unique estimate for a and b (or M and θ).

Figure 1:
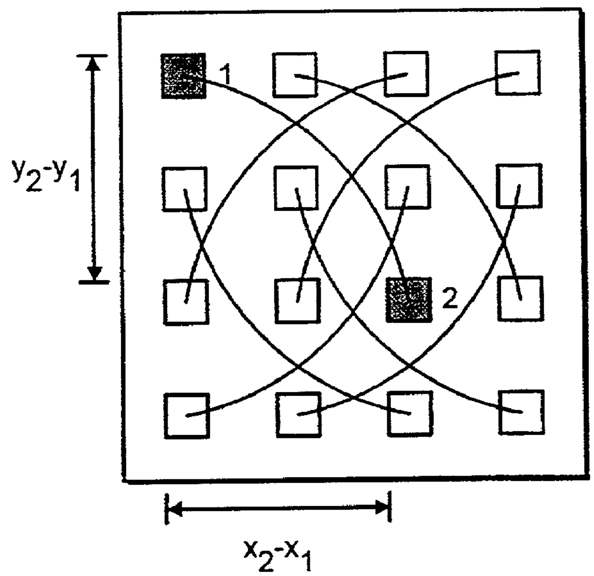
FIG. 1 shows the block sampling pattern used to estimate motion parameters in the preferred embodiment of the present invention.

Although the results do not depend upon which particular pair of blocks is chosen, to avoid ill-conditioned results it is preferably that neither $x_1-x_2$ nor $y_1-y_2$ should be too small. FIG. 1 shows the preferred approach to selecting two blocks within the image: selecting the sample pairs in a "herringbone" pattern avoids this problem. Instead of using a "herringbone" pattern, the pairs of sample blocks could be chosen at random. If such an approach is taken, pairs of blocks which are very close in the x direction or very close in the y direction may have to be eliminated to avoid ill-conditioning problems. Provided that the sample pairs are distributed reasonably well across the entire image, the exact method by which the pairs are chosen is not of particular importance. Not all of the blocks in the image need be taken as paired sample blocks. Depending upon the application, a selection of blocks across the image amounting to as little as 5% of all blocks may be sufficient to obtain reasonable estimates of the parameter values.

Each of the sample pairs will provide one sample value for M and one for θ as given by the above equations (or equivalently, a and b). Selecting numerous sample pairs from the image gives us numerous potential values for M and θ, and from these the true global values must now be determined. To do this, we rank the M estimates in order, producing a graph similar to that shown in FIG. 2A. The curve shown is typical, with a central flat area 10, flanked by upper and lower "outliers" 12,14. The true global motion is indicated by the long flat stretch 10, while the outliers 12,14 are the result of noise, the motion of small objects, and block mis-matches.

From the graph in FIG. 2A we now need to estimate the "best" value for the true, global value of M. This may be done in a number of ways, including simply examining the ordered list for flat spots or regions. Alternatively, estimation may be carried out by differentiating the graph of FIG. 2A, to create the graph shown schematically in FIG. 2B. This may be done using any convenient numerical differentiation algorithm, for example by taking the points in turn and calculating the mean value of the slope at that point using a simple [1 0−1] filter. The differentiation results in the long flat stretch 10 in FIG. 2A taking near-zero values, with the outliers 12,14 taking higher values, respectively 16,18. When differentiating the ranked list of estimates the first and last value cannot be differentiated accurately, as they have only one neighbour each. This is not a problem, however, as the extreme values are almost certainly spurious in any event.

The "best" value for M is then found by looking for the longest run of values below a threshold value, indicated at 20, and choosing the minimum value 22 within that range. If the longest run of results falling below the threshold value is a small proportion of the number of estimates found in the list, there may be no global motion for that parameter. In such a case, one could either choose "no global motion" (set a value of zero for translation, one for zoom or zero for rotation), or choosing the minimum value in the longest run as the best available global motion estimate.

The threshold value 20 may easily be determined by experiment, for any particular application.

Each pair of sample blocks in the image also provides an independent estimate for θ. Those estimates are ordered in the same way, and that ordered list differentiated to find the "best" global estimate for the rotation.

Once the global values of M and θ have been determined, individual values of $d_x$ and $d_y$ can be obtained for each of the sample blocks, using the equations above. It should be noted that once M and θ have been determined, the sample blocks no longer need to be taken in pairs: each sample block can then be used to define its own independent estimate for the global value of $d_x$ and $d_y$. The independent estimates for $d_x$ and $d_y$ are again treated in the same way, namely they are ordered, listed, and the list differentiated. As before, the "best" global estimate is defined by looking for the longest run of values below a threshold, in the differentiated list, and choosing the minimum value within that range.

It will of course be understood that since a=M cos θ and b=M sin θ, the "best" global values of a and b (rather than M and θ) instead could be determined in the same way. That may be computationally preferable.

As described above, each pair of selected blocks generates only half as many estimates of a and b (or M and θ) as there are block matches. Instead of determining both a and b together (or M and θ together), as discussed above, one could instead estimate in one of the parameters first and then recompute the matches to give the full number of estimates of the other parameter.

The methods could also be applied iteratively. This could be done by successively recompiling the individual parameters until the estimates cease to improve.

A slightly simplified approach can be taken when the parameter b (or equivalently θ) can be assumed to be zero. In that case, each sample block pair will provide two separate estimates for M, one being based upon the x value differences, and the other on the y value differences, as follows:

$$M=(u_1-u_2)/(x_1-x_2)$$

$$M=(v_1-v_2)/(y_1-y_2)$$

All of the "x estimates" and "y estimates" of M may be placed within one consolidated sorted list, to be differentiated as discussed above and as shown in FIG. 2. Alternatively, separate estimates of the global value of M could be obtained by separately sorting the "x estimates" and the "y estimates". In either event, once the "best" global value for M has been determined, further ranked lists of parameters $d_x$ and $d_y$ may be created from the individual sample points. These ranked lists are then differentiated in the usual way to estimate the "best" global motion values for those parameters.

In one embodiment, when it is not known a priori whether the value of b (or θ) is zero, the global value of that parameter is determined first. If the value thus obtained is zero or small, there is no rotation, and the simplified model described above, yielding two values of M for each pair of sample blocks, can be used.

If it is known, or can be assumed, that there is neither zoom nor rotation, individual estimates of $d_x$ and $d_y$ can immediately be obtained merely by measuring the movement of single sample blocks within the image. The individual $d_x$ and $d_y$ values can then be ordered and differentiated in the usual way.

Figure 2:
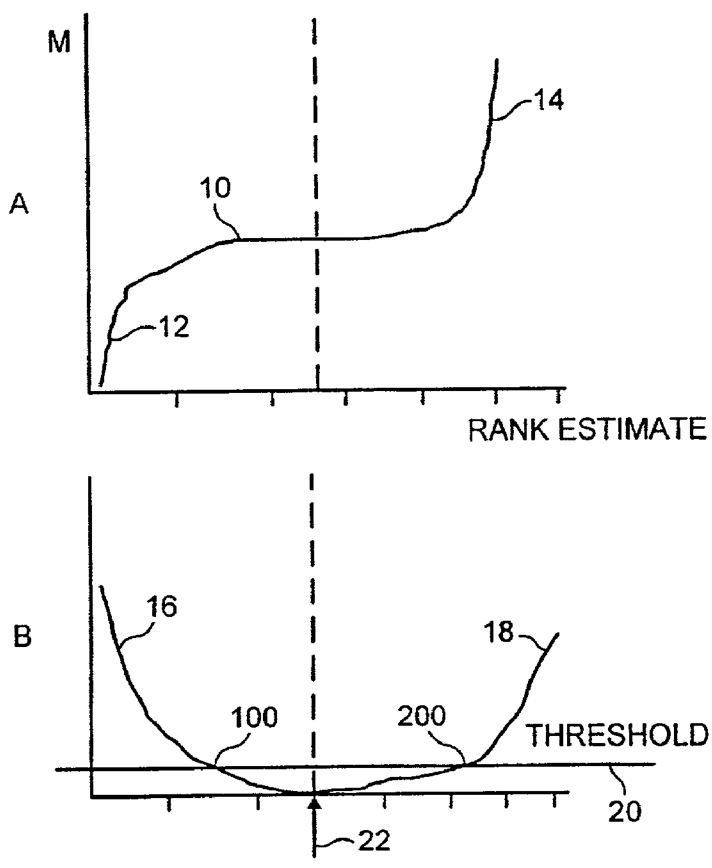
FIG. 2A illustrates schematically a ranked list of estimates for one of the parameters.
FIG. 2B is the first derivative of FIG. 2A.

With reference to FIG. 2, the "best" global value for a given parameter is preferably determined by choosing the minimum value within the longest run of values below the threshold. The "best" value could however be determined in other ways, for example by defining the mid point between the start 100 and the end 200 of the range. Other approaches could also be used.

Sorting the parameter estimates into order requires the use of a sorting routine. Any suitable sorting algorithm could be used, such as the standard algorithms Shellsort or Heapsort.

Motion estimation may be based solely upon the luminance (Y) frames. It can normally be assumed that the motion of the chrominance (U and V) frames will be the same.

An extension of the above-described procedure may be used to identify multiple motions. Having obtained a dominant motion, as described above (or at least the motion of a sufficiently large proportion of the image), we can then remove from consideration those blocks which the motion model fits to some satisfactory degree, for example below some threshold in the matching parameter. The process may then be repeated to find further models for other groups of blocks moving according to the same model parameters.

Motion Compensation:

Motion compensation is the task of applying the global motion parameters to generate a new frame from the old data. This is on the whole a far simpler task than motion estimation.

Intuitively, one would perhaps want to take the old pixel locations and intensities, apply the motion equations, and place them in the resulting new locations in the new frame. Actually, however, we do the reverse of this by considering the locations in the new frame, and finding out where they came from in the old. This is achieved using the equations quoted above linking the new values (x,y) with the old values (u,v). The intensity value found at (u,v) can then be placed at (x,y).

It is possible that the equations will generate a fractional pixel location, due to the real-valued nature of the motion parameter. One approach would simply be to round the co-ordinates to the nearest pixel, but this would introduce additional error. Instead, more accurate results can be achieved by rounding the co-ordinates to the nearest half pixel, and using bilinear interpolation to achieve half pixel resolution intensity values.

Because we are applying the same motion to every pixel in the frame, values near the edges in the new frame could appear to come from outside the old frame. In this circumstance, we simply use the nearest half pixel value in the old frame.

Figure 3:
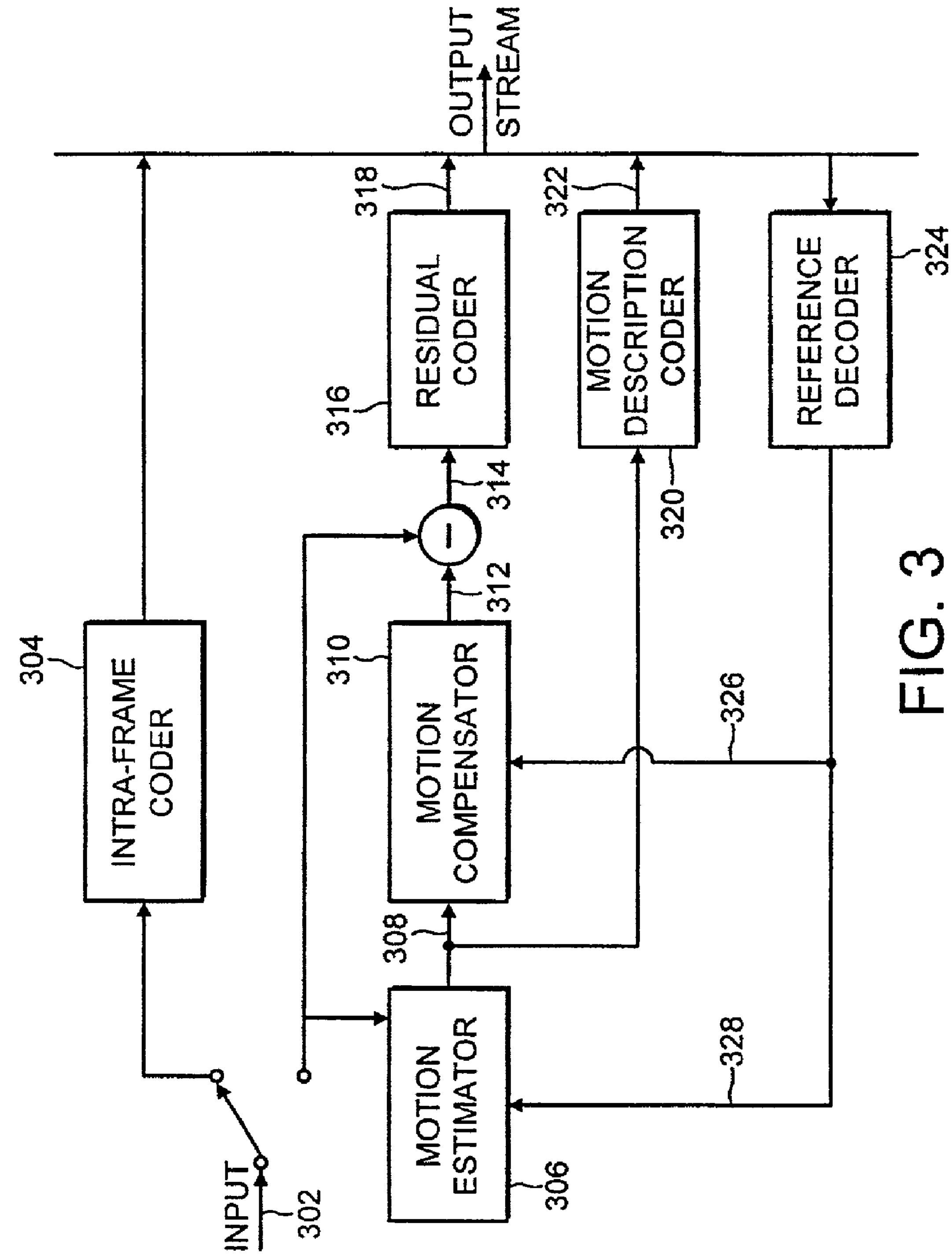
FIG. 3 illustrates schematically a preferred coder for use with the present invention.

Coder:

The motion estimation and motion compensation methods discussed above may be incorporated within a hardware or software decoder, as shown in FIG. 3. Frame by frame input is applied at an input 302, with the intra-frame data being passed to an intra-frame coder 304 and the inter-frame data being passed to a motion estimator 306 which operates according to the method described above. The motion estimator provides the parametised motion description on line 308 which is passed to a motion compensator 310. The motion compensator outputs a predicted frame along a line 312 which is subtracted from the input frame to provide a residual frame 314 which is passed to a residual coder 316. This codes the residual frame and outputs the residual data on 318 to the output stream.

The motion description on line 308 is passed to a motion description coder 320, which codes the description and outputs motion data on a line 322.

The output stream consists of coded intra-frame data, residual data and motion data.

The output stream is fed back to a reference decoder 324 which itself feeds back a reference frame (intra or inter) along lines 326, 328 to the motion compensator and the motion estimator. In that way, the motion compensator and the motion estimator are always aware of exactly what has just been sent in the output stream. The reference decoder 324 may itself be a full decoder, for example as illustrated in FIG. 4.

Figure 4:
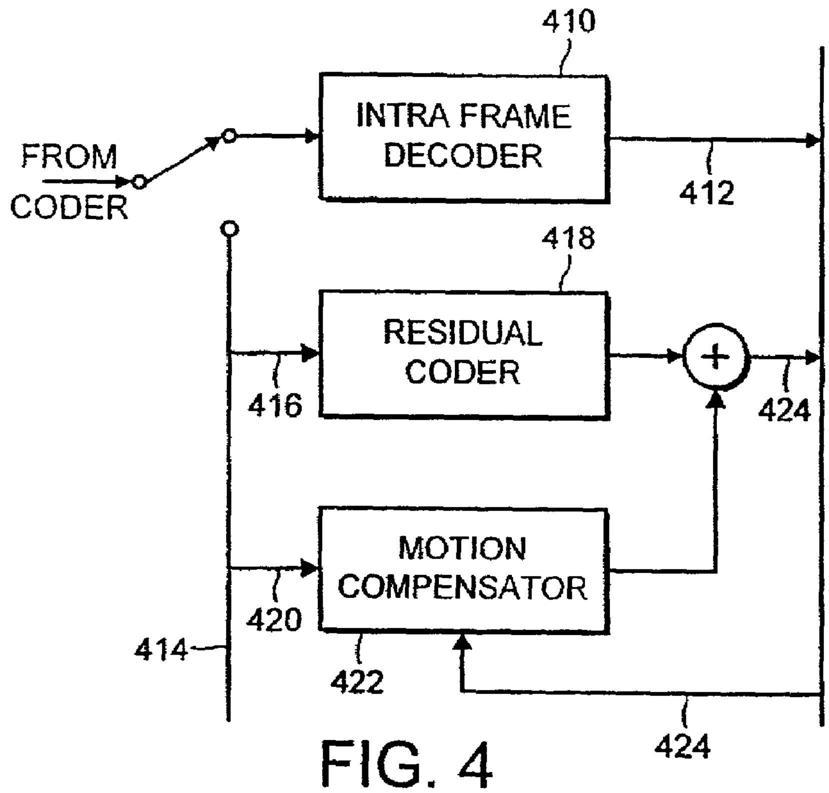
FIG. 4 illustrates a preferred decoder for use with the present invention.

The output stream travels across a communications network and, at the other end, is decoded by a decoder which is shown schematically in FIG. 4. The intra-information in the data stream is supplied to an intra-frame decoder 410, which provides decoded intra-frame information on a line 412. The inter information is supplied to a bus 414. From that bus, the residual data is transmitted along a line 416 to a residual decoder 418. Simultaneously, the motion data is supplied along a line 420 to a motion compensator 422. The outputs from the residual decoder and the motion compensator are added together to provide a decoded inter-frame on line 424.

Reference frame information is fed back along a line 424 to the motion compensator, so that the motion compensator always has current details of both the output from and the input to the decoder.

The preferred methods of motion estimation and compensation may of course be applied within codecs other than those illustrated in FIGS. 3 and 4.

What is claimed is:

1. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list wherein the best global value is determined by differentiating the ordered list to create an output list, and selecting a minimum value of the output list and wherein the determination of the best global value includes the step of selecting the longest run of values in the output list below a threshold value.

2. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list wherein the best global value is determined by differentiating the ordered list to create an output list, and selecting a minimum value of the output list in which the determination of the best global value includes the step of selecting the longest run of values in the output list below a threshold value, and selecting a mid-point of the said longest run.

3. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list, in which the transform is a similarity transform and in which an estimate of M cos θ where M sin θrepresents zoom and θ represents rotation is calculated for each pair of selected blocks in the first frame; and in which the best global values of M cos θ and M sin θ are determined from respective ordered lists.

4. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list in which the transform is a similarity transform and in which an estimate of zoom is calculated for each pair of selected blocks in the first frame, the best global zoom value being determined from a zoom values ordered list and in which the best global zoom value is fed back into the similarity transform to produce a plurality of estimates of translation parameters in x and y, the best global translation parameters in x and y being determined from respective ordered lists.

5. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list in which the transform is a similarity transform and in which an estimate of zoom and rotation is calculated for each pair of selected blocks in the first frame, the best global zoom and rotation value being determined from respective zoom and rotation value ordered lists and in which the said best global estimates are fed back into the similarity transform to produce a plurality of estimates of translation parameters in x and y, the best global translation parameters in x and y being determined from respective ordered lists.

6. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list in which the transform is a similarity transform and in which two estimates of zoom are calculated for each pair of selected blocks in the first frame, the two estimates being sorted into a single consolidated ordered list, and the best global zoom value being determined by examining the consolidated ordered list and in which the best global zoom value is fed back into the similarity transform to produce a plurality of estimates of translation parameters in x and y, the best global translation parameters in x and y being determined from respective ordered lists.

7. A method of video motion estimation for determining the dominant motion in a video image, said dominant motion being defined by a parametric transform which maps the movement of an image block from a first frame of the video to a second frame; the method comprising:

(a) selecting a plurality of blocks in the first frame, and matching said blocks with their respective block positions in the second frame;

(b) from the measured movements of the blocks between the first and second frames, calculating a plurality of estimates for a parameter of the transform;

(c) sorting the parameter estimates into an ordered list; and (d) determining a best global value for the parameter by examining the ordered list in which the transform is a similarity transform and in which an estimate of M cos θ where M sin θ represents zoom and θ represents rotation is calculated for each pair of selected blocks in the first frame; and in which the best global values of M cos θ and M sin θ are determined from respective ordered lists, and in which the said best global estimates are fed back into the similarity transform to produce a plurality of estimates of translation parameters in x and y, the best global translation parameters in x and y being determined from respective ordered lists.

* * * * *